US012091582B2

United States Patent
Hu

(10) Patent No.: US 12,091,582 B2
(45) Date of Patent: Sep. 17, 2024

(54) PROCESS AND DEVICE FOR IMPROVEMENT TREATMENT OF POLYESTER CORD AND RUBBER ADHESIVE

(71) Applicant: Jiangsu Guoli Chemical Technology Co., Ltd., Yixing (CN)

(72) Inventor: Lixin Hu, Yixing (CN)

(73) Assignee: Jiangsu Guoli Chemical Technology Co., Ltd., Yixing (CN)

( * ) Notice: Subject to any disclaimer, the term of this patent is extended or adjusted under 35 U.S.C. 154(b) by 0 days.

(21) Appl. No.: 18/292,915

(22) PCT Filed: Aug. 8, 2023

(86) PCT No.: PCT/CN2023/111743
§ 371 (c)(1),
(2) Date: Jan. 28, 2024

(87) PCT Pub. No.: WO2024/037381
PCT Pub. Date: Feb. 22, 2024

(65) Prior Publication Data
US 2024/0263049 A1  Aug. 8, 2024

(30) Foreign Application Priority Data

Aug. 16, 2022 (CN) .......................... 202210979345.0

(51) Int. Cl.
*B29C 31/04* (2006.01)
*B29B 7/00* (2006.01)
(Continued)

(52) U.S. Cl.
CPC ............... *C09J 11/04* (2013.01); *B29B 7/007* (2013.01); *B29B 7/40* (2013.01); *B29B 9/12* (2013.01);
(Continued)

(58) Field of Classification Search
None
See application file for complete search history.

(56) References Cited

FOREIGN PATENT DOCUMENTS

| CN | 110484165 A | 11/2019 |
| CN | 110965312 A | 4/2020 |

(Continued)

OTHER PUBLICATIONS

International Search Report, issued in PCT/CN2023/111743, dated Oct. 25, 2023.
(Continued)

*Primary Examiner* — David P Turocy
(74) *Attorney, Agent, or Firm* — Zhu Lehnhoff LLP

(57) ABSTRACT

The present disclosure relates to the technical field of adhesion property improvement, particularly to a process and device for improvement treatment of a polyester cord and a rubber adhesive. By filling an extremely few amount of calcined gypsum powders into chloroprene rubber to be secondarily stirred and extruded while adding fatty acid calcium and an anti-aging agent and uniformly mixing a stirring and mixing component using a specific solvent, the adhesion behavior between the rubber adhesive and the polyester cord is increased, and the bonding strength between the rubber adhesive and the polyester cord is improved; furthermore, through mutual connection and installation of the extrusion modification component, stirring and mixing component and the compounding modification component, continuous operation of modification treatment of the polyester cord and the rubber adhesive, the structure is simple, and use is convenient.

5 Claims, 3 Drawing Sheets

(51) Int. Cl.

| | |
|---|---|
| *B29B 7/40* | (2006.01) |
| *B29B 9/12* | (2006.01) |
| *B29C 35/08* | (2006.01) |
| *B29C 37/00* | (2006.01) |
| *B29C 48/00* | (2019.01) |
| *B29C 48/04* | (2019.01) |
| *B29C 48/154* | (2019.01) |
| *B29C 48/25* | (2019.01) |
| *C09J 5/02* | (2006.01) |
| *C09J 11/04* | (2006.01) |
| *C09J 11/06* | (2006.01) |
| *C09J 111/00* | (2006.01) |
| *B29K 105/00* | (2006.01) |
| *B29K 509/00* | (2006.01) |
| *B29L 31/00* | (2006.01) |
| *C08K 3/30* | (2006.01) |
| *C08K 5/098* | (2006.01) |

(52) U.S. Cl.
CPC ...... *B29C 35/0805* (2013.01); *B29C 37/0025* (2013.01); *B29C 48/022* (2019.02); *B29C 48/04* (2019.02); *B29C 48/154* (2019.02); *B29C 48/252* (2019.02); *C09J 5/02* (2013.01); *C09J 11/06* (2013.01); *C09J 111/00* (2013.01); *B29C 2035/0827* (2013.01); *B29K 2011/00* (2013.01); *B29K 2105/0005* (2013.01); *B29K 2105/251* (2013.01); *B29K 2509/00* (2013.01); *B29L 2031/707* (2013.01); *C08K 2003/3045* (2013.01); *C08K 5/098* (2013.01); *C09J 2400/10* (2013.01); *C09J 2400/20* (2013.01); *C09J 2411/00* (2013.01)

(56) References Cited

FOREIGN PATENT DOCUMENTS

| | | |
|---|---|---|
| CN | 113403002 A | 9/2021 |
| CN | 115322416 | 11/2022 |
| EP | 0043410 A2 | 1/1982 |
| WO | 2005019520 A1 | 3/2005 |
| WO | 2007058316 A1 | 5/2007 |

OTHER PUBLICATIONS

Written Opinion, issued in PCT/CN2023/111743, dated Oct. 25, 2023.

Notice of grant of patent right for invention, issued in CN202210979345.0 (priority application), by CNIPA, dated Aug. 2, 2023.

PROCESS AND DEVICE FOR IMPROVEMENT TREATMENT OF POLYESTER CORD AND RUBBER ADHESIVE

TECHNICAL FIELD

The present disclosure relates to the technical field of adhesion behavior modification, particularly to a process and device for improvement treatment of a polyester cord and a rubber adhesive.

BACKGROUND

A rubber adhesive is one of indispensable materials in production and daily life, which is widely applied to light industry production. With the increasing expansion of the use range of the rubber adhesive, there are higher and higher requirements for the adhesion behavior of the rubber adhesive, which are mainly reflected in ① environmental friendliness and no toxicity; ② excellent adhesion behavior; ③ low cost. Therefore, the materials of the rubber adhesive should be carefully considered while ensuring the excellent adhesion behavior of the rubber adhesive, thereby avoiding the use of a large number of toxic and harmful components and components with high raw material costs and then achieving the goal of reducing the toxicity and production costs of the rubber adhesive. For example, patent 201910651926. X discloses a high and low temperature-resistant environmental-friendly chloroprene rubber adhesive and a preparation method thereof, in which a chloroprene rubber blend is formed by mixing chloroprene rubber, zinc oxide, magnesium oxide, a promoter MTT-80, a promoter DM, stearic acid, carbon black, an anti-aging agent and a maleic anhydride grafted polymer, thereby reducing the harm to a human body while improving the adhesion behavior with a nylon cord, a polyvinyl chloride cord, a polyester cord and other materials, and ensuring and improving the adhesion behavior while reducing the harm to the human body and promoting environmental-friendly performance.

SUMMARY

Technical Problem

However, it is widely known by those skilled in the art that when the rubber adhesive is compounded and adhered with various cords, it is not only affected by the performance of the rubber adhesive itself, but also by the properties of various cords, and then the performance of their mutual adhesion is affected. Therefore, how to match specific rubber adhesives with specific properties of cords to achieve the aim of improving the comprehensive performance of the rubber adhesive when being compounded with the cord, and has attracted the attention of those skilled in the art.

In view of this, this researcher improves mutual compounding performance of the polyester cord and the rubber adhesive through countless continuous efforts and attempts, and performs simultaneous modification on the polyester cord and the rubber adhesive, thereby achieving the increase in adhesive force strength of compounding between them, while providing a new thinking and device for improvement of the polyester cord and the rubber adhesive in order to achieve continuous treatment of the polyester cord and the rubber adhesive.

Solution

In order to solve the above technical problems existing in the prior art, the present disclosure provides a process and device for improvement treatment of a polyester cord and a rubber adhesive.

Specifically, the process and device are achieved through the following technical solution.

The first objective of the present disclosure is to provide a process for improvement treatment of a polyester cord and a rubber adhesive, comprising the following steps:

S1: extruding chloroprene rubber into particles with a particle size of ≤0.08 cm by spiral stirring, and controlling the temperature of the stirring process at 30-40° C., stirring and extruding until the discharge time of the particles is 1 min, so as to obtain chloroprene rubber particles;

S2: extruding chloroprene rubber particles by spiral stirring, and adding calcined gypsum powders accounting for 0.05-0.1% of the mass of chloroprene rubber, calcium stearate accounting for 0.1-0.8% of the mass of chloroprene rubber and an anti-aging agent accounting for 1-3% of the mass of chloroprene rubber before opening of spiral stirring, extruding by opening spiral stirring, controlling the temperature at 80-100° C., and then forming particles with a particle size of ≤0.5 cm after stirring and extruding for 0.5-1 min, so as to obtain coarse rubber particles;

S3: mixing the coarse rubber particles with a solvent in a mass ratio of 1:5-7 and uniformly stirring, so as to obtain a modified rubber adhesive;

S4: irradiating a polyester cord at a distance of 10 cm using a 30 W UV lamp at the irradiation temperature of 25-30° C., so as to obtain a UV modified polyester cord;

S5: compounding the modified rubber adhesive onto the UV modified polyester cord under 80-100 g/cm$^2$ by using a mode of brushing, spraying or dipping, so as to obtain a compounded sheet; and S6: performing baking treatment on the compounded sheet at the temperature of 50-60° C. for at least 10 min.

By filling an extremely few amount of calcined gypsum powders into chloroprene rubber to be secondarily stirred and extruded while adding fatty acid calcium and an anti-aging agent and uniformly mixing a stirring and mixing component using a specific solvent, the adhesion behavior between the rubber adhesive and the polyester cord is increased, and the bonding strength between the rubber adhesive and the polyester cord is improved.

In order to enable the rubber adhesive to have excellent modification effect, preferably, the anti-aging agent is a composite formed by mixing paraffin with an anti-aging agent 3100 in a mass ratio of 0.1-0.5:1.

In order to enable the coarse rubber particles to be evenly mixed, preferably, the solvent is formed by adding 0.01-0.1 kg of gasoline and 0.1-0.5 kg of gutter oil into 1 kg of ethyl acetate.

Preferably: the calcined gypsum powders are powders obtained by directly calcining phosphogypsum for 20-30 min at 800-1000° C., and then performing ball milling with a ball mill and screening via a 300-mesh sieve.

The second objective of the present disclosure is to provide a device for improvement treatment of a polyester cord and a rubber adhesive, comprising an extrusion modification component, a stirring and mixing component and a compounding modification component, the bottom of the extrusion modification component is provided with a second rack, and the bottom of the compounding modification component is provided with a first rack, the first rack and the second rack are integrally formed, and the extrusion modification component includes feed components, an extrusion modification cylinder, a third motor, a spiral extrusion component and a discharge plate; chloroprene rubber particles to be modified are needed to be fed from the feed component and then enter the extrusion modification cylinder, extruded by spiral stirring under the driving of the third motor and then discharged out from the end of the discharge plate so as to achieve the stirring and extrusion modification of chloroprene rubber; the discharge plate is arranged at the right end of the extrusion modification cylinder, the spiral extrusion component is arranged inside the extrusion modification cylinder, the feed components are arranged on the top of the extrusion modification cylinder close to the left end, the third motor is located at the left end of the extrusion modification cylinder, the third motor is connected with the spiral extrusion component, and two feed components are arranged on the extrusion modification cylinder from left to right, which are a first hopper and a second hopper respectively; the bottom of the stirring and mixing component is provided with a rubber leaking tube which can achieve the discharge of mixed materials inside the stirring and mixing component, and the compounding modification component includes a compounding box which achieves that the polyester cord and the rubber adhesive are compounded into a whole, the top of the compounding box is sequentially provided with a UV light plate, a rubber sizing and compounding plate and a drying plate to achieve the UV irradiation modification of the polyester cord and then sizing and compounding on the rubber sizing and compounding plate so that the polyester cord and the rubber adhesive are compounded into a whole followed by drying under the drying plate. The compounding modification effect of the polyester cord and the rubber adhesive is improved, the adhesion behavior of the polyester cord and the rubber adhesive is improved, the center of the rubber sizing and compounding plate is provided with a rubber sizing plate, and the rubber leaking tube is communicated with the rubber sizing plate, and the right end of the extrusion modification cylinder extends into the stirring and mixing component. By extending the right end of the extrusion modification cylinder into the stirring and mixing component, chloroprene rubber is stirred and extruded and then input into the stirring and mixing component, a solvent is introduced to be mixed with chloroprene rubber and then discharged from the rubber leaking tube at the bottom of the stirring and mixing component.

In order to ensure secondary spiral extrusion modification and guarantee modification effects, preferably, the extrusion modification cylinder includes a first extrusion portion and a second extrusion portion, the first extrusion portion and the second extrusion portion are integrally formed, and both the first extrusion portion and the second extrusion portion are provided with two layers of cavities from inside to outside, the cavity in the inner layer is an extrusion cavity, and the cavity in the outer layer is a heat exchange cavity: the extrusion cavity located in the first extrusion portion is internally provided with a first spiral shaft, the extrusion cavity located in the second extrusion portion is internally provided with a second spiral shaft, and an extrusion plate is arranged between the extrusion cavity located in the first extrusion portion and the extrusion cavity located in the second extrusion portion, the extrusion plate is provided with several extrusion holes where materials are extruded and pass; the right end of the extrusion cavity located in the second extrusion portion is provided with a discharge plate, and the discharge plate is provided with several discharge holes where the materials are extruded and pass; the first spiral shaft and the second spiral shaft are integrally formed, and the extrusion plate passes through a connection point between the first spiral shaft and the second spiral shaft; the left end of the first spiral shaft passes through the extrusion cavity located in the first extrusion portion and is connected with the third motor; the right end of the second spiral shaft passes through the discharge plate, and the end portion of the right end of the second spiral shaft is provided with a fixing nut; the heat exchange cavity is provided with a liquid inlet and a liquid outlet communicating the inside of the heat exchange cavity with the outside of the heat exchange cavity; the first extrusion portion is provided with a first hopper capable of feeding materials into the extrusion cavity located inside the first extrusion portion, and the second extrusion portion is provided with a second hopper capable of feeding materials into the extrusion cavity located inside the second extrusion portion; the extrusion plate and the outer wall of the extrusion modification cylinder are tightly fixed by using fixing bolts. The first hopper and the second hopper form a feed component, the first spiral shaft and the second spiral shaft form a spiral extrusion component, and the first and second extrusion portions form an extrusion modification cylinder. First, chloroprene rubber is subjected to temperature control and spiral extrusion in advance, then modifying agent components such as calcined gypsum powders, calcium stearate, and an anti-aging agent are added for secondary temperature control and stirring so that chloroprene rubber is discharged into the stirring and mixing component to be mixed with a solvent, which can achieve the enhancement of the modification effect of the rubber adhesive.

In order to enhance the balance of the extrusion modification cylinder, preferably, a balance plate is arranged between the extrusion modification cylinder and the second rack, the balance plate and the second rack are integrally formed, and the extrusion modification cylinder is fixedly connected with the balance plate by using a stator.

In order to achieve the compounding modification of the polyester cord and the rubber adhesive and enhance the adhesion behavior of the polyester cord and the rubber adhesive, preferably, the stirring and mixing component includes a mixing cylinder with a cone-shaped bottom, the top of the mixing cylinder is provided with a solvent tube, a top door and a second motor; the mixing cylinder is internally provided with a stirring component, and the stirring component is connected with the second motor; the bottom of the mixing cylinder is provided with a rubber leaking tube, and the rubber leaking tube is provided with a screw thread valve; the side surface of the UV light plate located in the compounding box is provided with a UV lamp, and the side surface of the drying plate located in the compounding box is provided with a drying lamp, and both the UV lamp and the drying lamp are provided with wires; the compounding box located on one side of the UV light plate is internally provided with a drive roll, and the compounding box located on one side of the drying lamp is internally provided with a driven roll, and a transmission component is arranged between the drive roll and the driven roll; the right end of the extrusion modification cylinder extends into the mixing cylinder. In more preferred technical solution, a clapboard is arranged between the UV light plate and the rubber sizing and compounding plate, a clapboard is arranged between the drying plate and the rubber sizing and compounding plate, the clapboard is used for preventing the rubber leaked from the rubber sizing and compounding plate from entering below an area corresponding to the adjacent UV light plate and drying plate. In some more preferred technical solutions, the mixing cylinder is provided with a cylinder fixing ring, and the cylinder fixing ring is fixedly connected with the second rack to enhance stability.

In order to promote the stirring and mixing uniformity of the materials, preferably, the stirring component includes a stirring shaft connected with the second motor, wherein the bottom of the stirring shaft extends into the bottom of the mixing cylinder, and the stirring shaft located in the mixing cylinder is provided with a stirring blade component and a discharge blade, the stirring blade component includes stirring blade plates distributed in an inverted triangular shape, the end portion of the top of the stirring blade plate far away from the stirring shaft is provided with stirring auricles, and the stirring blade plate is provided with several flowing holes, and the discharge blade is located at the connection point between the mixing cylinder and the rubber leaking tube.

In order to ensure the uniformity of rubber sizing, preferably, the interior of the rubber sizing plate is in a hollow shape, and the bottom of the rubber sizing plate is provided with several rubber leaking holes.

Beneficial Effects (1) The present disclosure utilizes the structural arrangement of the extrusion modification component, the stirring and mixing component and the compounding modification component while appropriately controlling the connection among the extrusion modification component, the stirring and mixing component and the compounding modification component, the consistency and continuity of the modification treatment of the polyester cord and the rubber adhesive are achieved, and it is realized that the polyester cord and the rubber adhesive are respectively modified in advance, then the modified polyester cord and the modified rubber adhesive are compounded to form the compounded rubber sheet followed by drying modification treatment, thereby improving the mutual adhesion behavior between the polyester cord and the rubber adhesive while ensuring the continuous modification treatment of the polyester cord and the rubber adhesive. Furthermore, process procedure is simple, application cost is low; and industrialized popularization is easy to carry out.

(2) The device used in the present disclosure can adapt to the modification treatment of various rubber adhesives and polyester cords. In this study, chloroprene rubber is used as the basic material of the rubber adhesive, and then the medication effect of the rubber adhesive is enhanced under the common action of calcined gypsum powders, calcium stearate, an anti-aging agent and other materials in combination with specific solvents. At the same time, the bonding strength (adhesive force) between the rubber adhesive and the polyester cord is greatly increased, which reaches over 20.3 N/cm.

Figure 1:
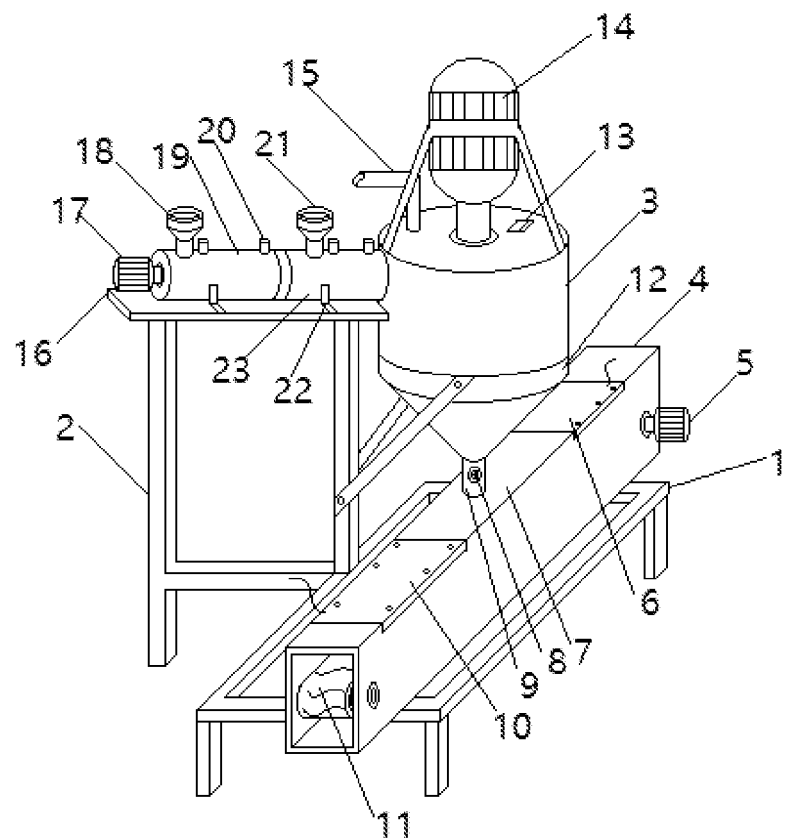
FIG. 1 is a schematic diagram of an entire structure of the present disclosure.
Figure 2:
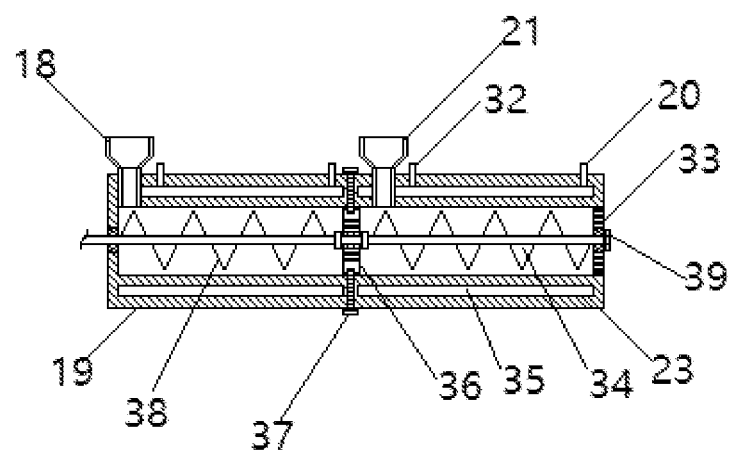
FIG. 2 is a partial sectional view of an extrusion modification component in FIG. 1.

1—first rack; 2—second rack; 3—mixing cylinder; 4—compounding box; 5—first motor; 6—UV light plate; 7—rubber sizing and compounding plate; 8—screw thread valve; 9—rubber leaking tube; 10—drying plate; 11—transmission component; 12—cylinder fixing ring; 13—top door; 14—second motor; 15—solvent tube; 16—balance plate; 17—third motor; 18—first hopper; 19—first extrusion portion; 20—liquid inlet; 21—second hopper; 22—fixing sheet; 23—second extrusion portion; 24—rubber sizing plate; rubber leaking hole; 26—drive roll; 27—driven roll; 28—wire; 29—UV lamp; 30—drying lamp; 31—clapboard; 32—liquid outlet; 33—discharge plate; 34—second spiral shaft; 35—heat exchange cavity; 36—extrusion plate; 37—fixing bolt; 38—first spiral shaft; 39—fixing nut; 40—stirring shaft; 41—stirring auricle; 42—stirring blade plate; 43—flowing hole; 44—discharge blade

DETAILED DESCRIPTION OF THE EMBODIMENTS

Next, the technical solution of the present disclosure will be further defined in combination with drawings and specific embodiments, but the scope of protection claimed is not limited to the made description.

In some embodiments, a process for improvement treatment of a polyester cord and a rubber adhesive includes the following steps:

S1: extruding chloroprene rubber into particles with a particle size of ≤0.08 cm by spiral stirring, and controlling the temperature of the stirring process at 30-40° C., stirring and extruding until the discharge time of the particles is 1 min, so as to obtain chloroprene rubber particles:

S2: extruding chloroprene rubber particles by spiral stirring, and adding calcined gypsum powders accounting for 0.05-0.1% of the mass of chloroprene rubber, calcium stearate accounting for 0.1-0.8% of the mass of chloroprene rubber and an anti-aging agent accounting for 1-3% of the mass of chloroprene rubber before opening of spiral stirring, extruding by opening spiral stirring, controlling the temperature at 80-100° C., and then forming particles with a particle size of ≤0.5 cm after stirring and extruding for 0.5-1 min, so as to obtain coarse rubber particles:

S3: mixing the coarse rubber particles with a solvent in a mass ratio of 1:5-7 and uniformly stirring, so as to obtain a modified rubber adhesive:

S4: irradiating a polyester cord at a distance of 10 cm using a 30 W UV lamp at the irradiation temperature of 25-30° C., so as to obtain a UV modified polyester cord:

S5: compounding the modified rubber adhesive onto the UV modified polyester cord under 80-100 g/cm$^2$ by using a mode of brushing, spraying or dipping, so as to obtain a compounded sheet; and S6: performing baking treatment on the compounded sheet at the temperature of 50-60° C. for at least 10 min.

In more preferred embodiments, the anti-aging agent is a composite formed by mixing paraffin with an anti-aging agent 3100 in a mass ratio of 0.1-0.5:1.

In more preferred embodiments, the solvent is formed by adding 0.01-0.1 kg of gasoline and 0.1-0.5 kg of gutter oil into 1 kg of ethyl acetate.

In more preferred embodiments, the calcined gypsum powders are powders obtained by directly calcining phosphogypsum for 20-30 min at 800-1000° C., and then performing ball milling with a ball mill and screening via a 300-mesh sieve.

As shown in FIG. 1-FIG. 5, in some embodiments, a device for improvement treatment of a polyester cord and a rubber adhesive includes an extrusion modification component, a stirring and mixing component and a compounding modification component, the bottom of the extrusion modification component is provided with a second rack 2, and the bottom of the compounding modification component is provided with a first rack 1, the first rack 1 and the second rack 2 are integrally formed, and the extrusion modification component includes feed components, an extrusion modification cylinder, a third motor 17, a spiral extrusion component and a discharge plate 33: the discharge plate 33 is arranged at the right end of the extrusion modification cylinder, the spiral extrusion component is arranged inside the extrusion modification cylinder, the feed components are arranged on the top of the extrusion modification cylinder close to the left end, the third motor 17 is located at the left end of the extrusion modification cylinder, the third motor 17 is connected with the spiral extrusion component, and two feed components are arranged on the extrusion modification cylinder from left to right; the bottom of the stirring and mixing component is provided with a rubber leaking tube, and the compounding modification component includes a compounding box 4, the top of the compounding box is sequentially provided with a UV light plate 6, a rubber sizing and compounding plate 7 and a drying plate 10, the center of the rubber sizing and compounding plate 7 is provided with a rubber sizing plate 24, and the rubber leaking tube 9 is communicated with the rubber sizing plate. 24 and the right end of the extrusion modification cylinder extends into the stirring and mixing component.

When in installation, the extrusion modification component is stably installed on the second rack 2, the compounding modification component is stably installed on the first rack 1, and the second rack 2 and the first rack 1 are integrally formed, the stirring and mixing component is installed between the extrusion modification component and the compounding modification component, so that the materials discharged from the extrusion modification component can directly enter the stirring and mixing component, the materials discharged from the stirring and mixing component enter the compounding modification component to achieve compounding modification treatment of a polyester cord and a rubber adhesive, thereby improving the bonding strength between the polyester cord and the rubber adhesive. Specifically, when in use, basic materials such as chloroprene rubber are added into the extrusion modification component, extruded through a spiral extrusion component and then discharged by the discharge plate 33 to enter the stirring and mixing component to be stirred and mixed with a solvent, so as to form a rubber adhesive. Then the rubber adhesive is discharged from the bottom of the stirring and mixing component into the compounding modification component to be compounded with the polyester cord, the polyester cord is treated by using an ultraviolet light lamp, a rubber sizing and compounding plate and a drying lamp, so as to achieve modification of the polyester cord, and promote the adhesion behavior of the polyester cord and the rubber adhesive after compounding modification of the polyester cord and the rubber adhesive.

In some embodiments, the extrusion modification cylinder includes a first extrusion portion 19 and a second extrusion portion 23, the first extrusion portion 19 and the second extrusion portion 23 are integrally formed, and both the first extrusion portion 19 and the second extrusion portion 23 are provided with two layers of cavities from inside to outside, the cavity in the inner layer is an extrusion cavity, and the cavity in the outer layer is a heat exchange cavity 35; the extrusion cavity located in the first extrusion portion 19 is internally provided with a first spiral shaft 38, the extrusion cavity located in the second extrusion portion 23 is internally provided with a second spiral shaft 34, and an extrusion plate 36 is arranged between the extrusion cavity located in the first extrusion portion 19 and the extrusion cavity located in the second extrusion portion 23, the extrusion plate 36 is provided with several extrusion holes where materials are extruded and pass; the right end of the extrusion cavity located in the second extrusion portion 23 is provided with a discharge plate 33, and the discharge plate 33 is provided with several discharge holes where the materials are extruded and pass; the first spiral shaft and the second spiral shaft are integrally formed, and a connection point between the first spiral shaft 38 and the second spiral shaft 34 passes through the extrusion plate 36; the left end of the first spiral shaft 38 passes through the extrusion cavity located in the first extrusion portion 19 to be connected with the third motor 17; the right end of the second spiral shaft 34 passes through the discharge plate 33, and the end portion of the right end of the second spiral shaft 34 is provided with a fixing nut 39; the heat exchange cavity is provided with a liquid inlet 20 and a liquid outlet 32 communicating the liquid inlet 20 and the liquid outlet 32 inside and outside the heat exchange cavity; the first extrusion portion 19 is provided with a first hopper 18 capable of feeding materials into the extrusion cavity located inside the first extrusion portion 19, and the second extrusion portion 23 is provided with a second hopper 21 capable of feeding materials into the extrusion cavity located inside the second extrusion portion 23; the extrusion plate 36 is tightly fixed with the outer wall of the extrusion modification cylinder through fixing bolts 37.

When in use, chloroprene rubber is spirally stirred and extruded through a spiral extrusion component in the first extrusion portion 19, and then discharged into the second extrusion section 23 under the action of an extrusion plate 36, meanwhile components such as calcined gypsum powder, calcium stearate, and an anti-aging agent are added into the second extrusion section 23 for a secondary spiral stirring and extrusion so as to achieve the secondary spiral stirring and extrusion modification of chloroprene rubber, then, the above modified chloroprene rubber is discharged into a mixing and stirring component through the discharge plate 33 for and mixing modification, thereby ensuring the bonding strength of the rubber adhesive after being compounded with the polyester cord, and improving the bonding strength of the rubber adhesive on the polyester cord, which reaches over 20 N/cm.

In some embodiments, a balance plate 16 is arranged between the extrusion modification cylinder and the second rack 2, the balance plate 16 and the second rack 2 are integrally formed, and the extrusion modification cylinder is fixedly connected with the balance plate 16 by using a stator 22. The stability is enhanced and convenience is improved.

In some embodiments, the stirring and mixing component includes a mixing cylinder 3 with a cone-shaped bottom, the top of the mixing cylinder 3 is provided with a solvent tube 15, a top door 13 and a second motor 14; the mixing cylinder 3 is internally provided with a stirring component, and the stirring component is connected with the second motor 14: the bottom of the mixing cylinder 3 is provided with a rubber leaking tube 9, and a screw thread valve 8 is installed on the rubber leaking tube 9; the side surface of the UV light plate 6 located in the compounding box 4 is provided with a UV lamp 29, and the side surface of the drying plate 10 located in the compounding box 4 is provided with a drying lamp 30, and both the UV lamp 29 and the drying lamp 30 are provided with wires 28; the compounding box 4 located on one side of the UV light plate 6 is internally provided with a drive roll 26, and the compounding box 4 located on one side of the drying lamp 30 is internally provided with a driven roll 27, and a transmission component 11 is provided between the drive roll 26 and the driven roll 27; the right end of the extrusion modification cylinder extends into the mixing cylinder 3. Continuous modification treatment is achieved, the structure is simplified, and operation is convenient.

Figure 3:
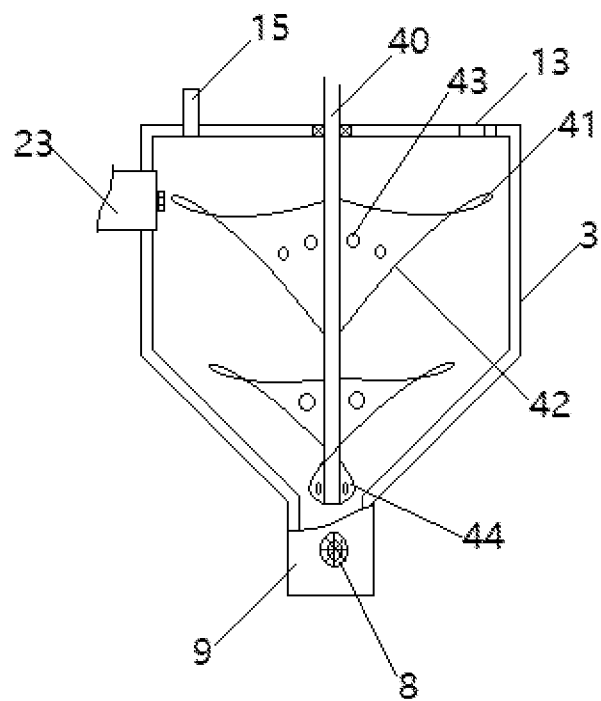
FIG. 3 is a partial sectional view of a stirring and mixing component in FIG. 1.
Figure 4:
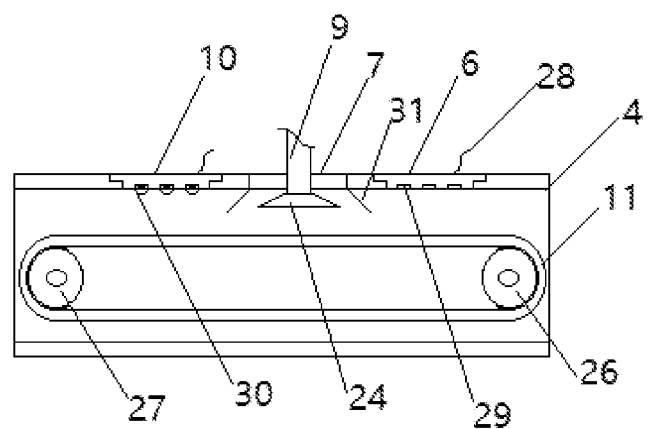
FIG. 4 is a partial sectional view of a compounding modification component in FIG. 1.
Figure 5:
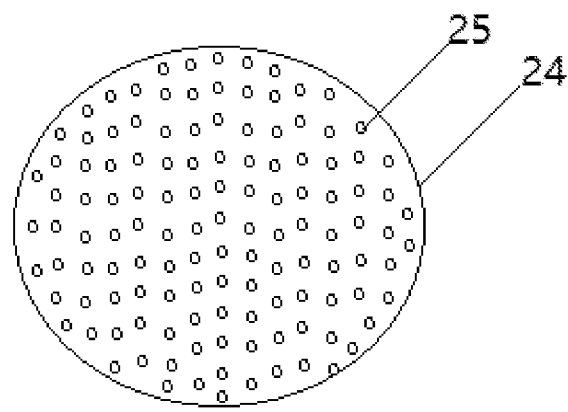
FIG. 5 is a bottom structural view of a rubber sizing plate in FIG. 4.

As shown in FIG. 3, in some embodiments, the stirring component includes a stirring shaft 40 connected with the second motor 14, the bottom of the stirring shaft 40 extends into the bottom of the mixing cylinder 3, and the stirring shaft 40 located in the mixing cylinder 3 is provided with a stirring blade component and a discharge blade 44, the stirring blade component includes stirring blade plates 42 distributed in an inverted triangular shape, the end portion of the top of the stirring blade plate 42 far away from the stirring shaft 40 is provided with stirring auricles, and the stirring blade plate 42 is provided with several flowing holes 43, and the discharge blade 44 is located at the connection point between the mixing cylinder 3 and the rubber leaking tube 9. The materials are more evenly mixed.

In some embodiments, the interior of the rubber sizing plate 24 is in a hollow shape, and the bottom of the rubber sizing plate 24 is provided with several rubber leaking holes 25.

In order to verify that the device in the present disclosure can bring better technical effects, the researchers of the present disclosure will use chloroprene rubber as the basic material, use calcined gypsum powders, calcium stearate, anti-aging agents and the like to be subjected to stirring and extrusion modification treatment, and then use ethyl acetate, gasoline (92 #) gutter oil (directly using the oil separated from the remaining kitchen materials) to be compounded into a solvent. After materials in the stirring and mixing component are mixed, rubber sizing is conducted on the polyester cord and an adhesive force test is conducted between the polyester cord and the rubber adhesive. Specific situations are described below:

The calcined gypsum powders used in the following tests are powders obtained by calcining at 800° C. for 30 min and then performing ball milling on a ball mill and screening via a 300-mesh sieve. The anti-aging agent is a composite formed by mixing paraffin with an anti-aging agent 3100 in a mass ratio of 0.1:1. The solvent is formed by adding 0.01 kg of gasoline and 0.1 kg of gutter oil into 1 kg of ethyl acetate.

Test 1
- S1: chloroprene rubber was extruded into particles with a particle size of ≤0.08 cm by spiral stirring and the temperature of the stirring process was controlled at 30-40° C., stirring and extruding were conducted until the discharge time of particles was 1 min, so as to obtain chloroprene rubber particles (completed in a first extrusion portion 19, and the temperature was controlled through water cold under the action of a liquid outlet 32 and a liquid inlet 20);
- S2: chloroprene rubber particles were extruded by spiral stirring, and calcined gypsum powders accounting for 0.05% of the mass of chloroprene rubber, calcium stearate accounting for the mass of 0.1% of chloroprene rubber and an anti-aging agent accounting for 1% of the mass of chloroprene rubber were added before opening of spiral stirring, extruding was conducted by opening spiral stirring, the temperature was controlled at 80-100° C., and then particles with a particle size of ≤0.5 cm were formed after stirring and extruding for 1 min, so as to obtain coarse rubber particles (completed in a second extrusion portion 23, and the temperature was controlled through water cold under the action of a liquid outlet 32 and a liquid inlet 20);
- S3: the coarse rubber particles were mixed with a solvent in a mass ratio of 1:5 and uniformly stirred, so as to obtain a modified rubber adhesive;
- S4: a polyester cord was irradiated for 5 min at a distance of 10 cm using a 30 W UV lamp at the irradiation temperature of 25-30° C., so as to obtain a UV modified polyester cord;
- S5: the modified rubber adhesive was compounded onto the polyester cord subjected to ultraviolet modification under 80 g/cm$^2$ by using a mode of brushing, spraying or dipping, so as to obtain a compounded sheet; and
- S6: the compounded sheet was baked at the temperature of 50-60° C. for at least 10 min.

Test 2
- S1: chloroprene rubber was extruded into particles with a particle size of ≤0.08 cm by spiral stirring and the temperature was controlled at 30-40° C. during the stirring, stirring and extruding were conducted until the discharge time of particles was 1 min, so as to obtain chloroprene rubber particles (completed in a first extrusion portion 19, and the temperature was controlled through water cold under the action of a liquid outlet 32 and a liquid inlet 20);
- S2: chloroprene rubber particles were extruded by spiral stirring, and calcined gypsum powder accounting for 0.1% of the mass of chloroprene rubber, calcium stearate accounting for the mass of 0.8% of chloroprene rubber and an anti-aging agent accounting for 3% of the mass of chloroprene rubber were added before opening of spiral stirring, extruding was conducted by opening spiral stirring, the temperature was controlled at 80-100° C., and then particles with a particle size of ≤0.5 cm were formed after stirring and extruding for 1 min, so as to obtain coarse rubber particles (completed in a second extrusion portion 23, and the temperature was controlled through water cold under the action of a liquid outlet 32 and a liquid inlet 20);
- S3: the coarse rubber particles were mixed with a solvent in a mass ratio of 1:7 and uniformly stirred, so as to obtain a modified rubber adhesive;
- S4: a polyester cord was irradiated for 5 min at a distance of 10 cm using a 30 W UV lamp at the irradiation temperature of 25-30° C., so as to obtain a UV modified polyester cord;
- S5: the modified rubber adhesive was compounded onto the polyester cord subjected to ultraviolet modification under 100 g/cm$^2$ by using a mode of brushing, spraying or dipping, so as to obtain a compounded sheet; and
- S6: the compounded sheet was baked at the temperature of 50-60° C. for at least 10 min.

Test 3
- S1: chloroprene rubber was extruded into particles with a particle size of ≤0.08 cm by spiral stirring and the temperature was controlled at 30-40° C. during the stirring, stirring and extruding were conducted until the discharge time of particles was 1 min, so as to obtain chloroprene rubber particles (completed in a first extrusion portion 19, and the temperature was controlled through water cold under the action of a liquid outlet 32 and a liquid inlet 20);

S2: chloroprene rubber particles were extruded by spiral stirring, and calcined gypsum powder accounting for 0.08% of the mass of chloroprene rubber, calcium stearate accounting for the mass of 0.3% of chloroprene rubber and an anti-aging agent accounting for 2% of the mass of chloroprene rubber were added before opening of spiral stirring, extruding was conducted by opening spiral stirring, the temperature was controlled at 80-100° C., and then particles with a particle size of ≤0.5 cm were formed after stirring and extruding for 1 min, so as to obtain coarse rubber particles (completed in a second extrusion portion 23, and the temperature was controlled through water cold under the action of a liquid outlet 32 and a liquid inlet 20);

S3: the coarse rubber particles were mixed with a solvent in a mass ratio of 1:6 and uniformly stirred, so as to obtain a modified rubber adhesive;

S4: a polyester cord was irradiated for 5 min at a distance of 10 cm using a 30 W UV lamp at the irradiation temperature of 25-30° C., so as to obtain a UV modified polyester cord;

S5: the modified rubber adhesive was compounded onto the polyester cord subjected to ultraviolet modification under 90 g/cm² by using a mode of brushing, spraying or dipping, so as to obtain a compounded sheet; and S6: the compounded sheet was baked at the temperature of 50-60° C. for at least 10 min.

The following tests were conducted on the basis of test 1, and others were the same as those in example 1.

Test 4

Others were the same as those in test 1, and the anti-aging agent was a composite formed by mixing paraffin with an aging agent 3100 in a mass ratio of 0.5:1. The solvent was formed by adding 0.1 kg of gasoline and 0.5 kg of gutter oil into 1 kg of ethyl acetate. The calcined gypsum powders were powders obtained by directly calcining phosphogypsum for 30 min at 1000° C., and then performing ball milling with a ball mill and screening via a 300-mesh sieve.

Test 5

Others were the same as those in test 1, and the anti-aging agent was a composite formed by mixing paraffin with an aging agent 3100 in a mass ratio of 0.3:1. The solvent was formed by adding 0.04 kg of gasoline and 0.4 kg of gutter oil into 1 kg of ethyl acetate. The calcined gypsum powders were powders obtained by directly calcining phosphogypsum for 20 min at 800° C., and then performing ball milling with a ball mill and screening via a 300-mesh sieve.

Test 6

Others were the same as those in test 1, chloroprene rubber, calcined gypsum, calcium stearate and an anti-aging agent were directly mixed and then subjected to ball milling in a ball mill until particles with a particle size <0.5 cm were obtained, the above particles were stirred and mixed with a solvent, and then the obtained mixture was subjected to rubber sizing compounding treatment.

Test 7

Others were the same as those in test 1, and a polyester cord was directly compounded with a rubber adhesive without ultraviolet irradiation and then dried.

Test 8

Others were the same as those in test 1, and the compounded sheet was irradiated with ultraviolet light and then dried.

The dried compounded sheets obtained in above-mentioned tests 1-8, an adhesive force test was conducted by using mutual stripping of the polyester cord and the rubber adhesive, for example, refer to determination on bonding strength between rubber and plastic soft tube, and the results are seen in Table 1 below.

TABLE 1

| | Test of adhesive force strength | | | | | | | |
|---|---|---|---|---|---|---|---|---|
| | Test 1 | Test 2 | Test 3 | Test 4 | Test 5 | Test 6 | Test 7 | Test 8 |
| N/cm | 21.4 | 20.9 | 21.2 | 20.7 | 20.3 | 12.5 | 13.1 | 22.2 |

Through tests, it can be seen that by respectively modifying the rubber adhesive and the polyester cord and then compounding to form the compounded sheet followed by drying, the adhesive force strength of compounding between the rubber adhesive and the polyester cord can be greatly enhanced, and the entire adhesion behavior of the polyester cord and the rubber adhesive is improved.

In order to better illustrate the modification effect in the process steps of the present disclosure, the researcher conducted several single factor variation tests in which the following single factor experiments were conducted.

A: in the modification process of the modified rubber adhesive, calcium stearate was directly used instead of calcined gypsum powders without addition of calcined gypsum powders.

B: in the modification process of the modified rubber adhesive, calcined gypsum powders were directly used instead of calcium stearate without addition of calcium stearate.

C: in the process of the modified rubber adhesive, the anti-aging agent is anti-aging gent 3100.

D: the solvent does not contain gutter oil.

E: the solvent does not contain gasoline 92 #.

All others were treated by reference to the treatment method in test 1 and prepared into compounded sheets, and then the compounded sheets were then used to detect the adhesive force strength. The results are shown in Table 2 below.

TABLE 2

| | Adhesive force strength under single factor variation | | | | |
|---|---|---|---|---|---|
| | A | B | C | D | E |
| N/cm | 14.5 | 15.1 | 19.2 | 18.7 | 11.5 |

It can be seen from data in Table 1 and Table 2 that the modification of the polyester cord and the rubber adhesive is achieved by entire technical solution, and then the purposes of enhancing the adhesive force strength between the polyester cord and the rubber adhesive and improving the adhesion behavior. Meanwhile, in order to ensure the continuous treatment of this modification process, achieve the simultaneous modification compounding of the polyester cord and the rubber adhesive, and improve the adhesion behavior of the compounding, the researcher provides a modification treatment device which is simple in structure, convenient to use, and easier to industrially popularize.

Other matters in the present disclosure can be implemented by referring to the existing technology or common knowledge and conventional technical means familiar to those skilled in the art. In addition, the structural drawings of the device created by the present disclosure are intended to facilitate those skilled in the art to master and understand the overall structure of the device of the present disclosure, and then can understand the true principles of the present disclosure and achieve an accurate understanding of the content of the present disclosure, rather than limiting the structural size of the device of the present disclosure.

The above descriptions are only preferred embodiments of the present disclosure, but the scope of protection of the present disclosure is not limited to this. Any equivalent replacements or changes made by those skilled in the art according to the technical solution of the present disclosure and its inventive concept within the technical scope disclosed in the present disclosure should be all included within the scope of protection of the present disclosure.

What is claimed is:

1. A process for improvement treatment of a polyester cord and a rubber adhesive, comprising the following steps:
   S1: extruding chloroprene rubber into particles with a particle size of ≤0.08 cm by spiral stirring, and controlling the temperature of the stirring process at 30-40° C., stirring and extruding until the discharge time of the particles is 1 min, so as to obtain chloroprene rubber particles;
   S2: extruding chloroprene rubber particles by spiral stirring, and adding calcined gypsum powders accounting for 0.05-0.1% of the mass of chloroprene rubber, calcium stearate accounting for 0.1-0.8% of the mass of chloroprene rubber and an anti-aging agent accounting for 1-3% of the mass of chloroprene rubber before opening of spiral stirring, extruding by opening spiral stirring, controlling the temperature at 80-100° C., and then forming particles with a particle size of ≤0.5 cm after stirring and extruding for 0.5-1 min, so as to obtain coarse rubber particles;
   S3: mixing the coarse rubber particles with a solvent in a mass ratio of 1:5-7 and uniformly stirring, so as to obtain a modified rubber adhesive;
   S4: irradiating a polyester cord at a distance of 10 cm using a 30 W UV lamp at the irradiation temperature of 25-30° C., so as to obtain a UV modified polyester cord;
   S5: compounding the modified rubber adhesive onto the UV modified polyester cord under 80-100 g/cm$^2$ by using a mode of brushing, spraying or dipping, so as to obtain a compounded sheet; and
   S6: performing baking treatment on the compounded sheet at the temperature of 50-60° C. for at least 10 min;
   wherein, the anti-aging agent is a composite formed by mixing paraffin with an anti-aging agent 3100 in a mass ratio of 0.1-0.5:1;
   the solvent is formed by adding 0.01-0.1 kg of gasoline and 0.1-0.5 kg of gutter oil into 1 kg of ethyl acetate;
   the calcined gypsum powders are powders obtained by directly calcining phosphogypsum for 20-30 min at 800-1000° C. and then performing ball milling with a ball mill and screening via a 300-mesh sieve;
   the following devices are used in the process, which include an extrusion modification component, a stirring and mixing component, and a compounding modification component, the bottom of the extrusion modification component is provided with a second rack (2), and the bottom of the compounding modification component is provided with a first rack (1), the first rack (1) and the second rack (2) are integrally formed, and the extrusion modification component includes feed components, an extrusion modification cylinder, a third motor (17), a spiral extrusion component and a discharge plate (33); the discharge plate (33) is arranged at the right end of the extrusion modification cylinder, the spiral extrusion component is arranged inside the extrusion modification cylinder, the feed components are arranged on the top of the extrusion modification cylinder close to the left end, the third motor (17) is located at the left end of the extrusion modification cylinder, the third motor (17) is connected with the spiral extrusion component, and two feed components are arranged on the extrusion modification cylinder from left to right; the bottom of the stirring and mixing component is provided with a rubber leaking tube (9), and the compounding modification component includes a compounding box (4), the top of the compounding box (4) is sequentially provided with a UV light plate (6), a rubber sizing and compounding plate (7) and a drying plate (10), the center of the rubber sizing and compounding plate (7) is provided with a rubber sizing plate (24), and the rubber leaking tube (9) is communicated with the rubber sizing plate (24), and the right end of the extrusion modification cylinder extends into the stirring and mixing component;
   the extrusion modification cylinder includes a first extrusion portion (19) and a second extrusion portion (23), the first extrusion portion (19) and the second extrusion portion (23) are integrally formed, and both the first extrusion portion (19) and the second extrusion portion (23) are provided with two layers of cavities from inside to outside, the cavity in the inner layer is an extrusion cavity, and the cavity in the outer layer is a heat exchange cavity (35); the extrusion cavity located in the first extrusion portion (19) is internally provided with a first spiral shaft (38), the extrusion cavity located in the second extrusion portion (23) is internally provided with a second spiral shaft (34), and an extrusion plate (36) is arranged between the extrusion cavity located in the first extrusion portion (19) and the extrusion cavity located in the second extrusion portion (23), the extrusion plate (36) is provided with several extrusion holes where materials are extruded and pass: the right end of the extrusion cavity located in the second extrusion portion (23) is provided with a discharge plate (33), and the discharge plate (33) is provided with several discharge holes where the materials are extruded and pass; the first spiral shaft (38) and the second spiral shaft (34) are integrally formed, and the extrusion plate (36) passes through a connection point between the first spiral shaft (38) and the second spiral shaft (34); the left end of the first spiral shaft (38) passes through the extrusion cavity located in the first extrusion portion (19) to be connected with the third motor (17); the right end of the second spiral shaft (34) passes through the discharge plate (33), and the end portion of the right end of the second spiral shaft (34) is provided with a fixing nut (39); the heat exchange cavity is provided with a liquid inlet (20) and a liquid outlet (32) communicating the inside of the heat exchange cavity with the outside of the heat exchange cavity; the first extrusion portion (19) is provided with a first hopper (18) capable of feeding materials into the extrusion cavity located inside the first extrusion portion (19), and the second extrusion portion (23) is provided with a second hopper (21) capable of feeding materials into the extrusion cavity located inside the second extrusion portion (23);

the extrusion plate (36) and the outer wall of the extrusion modification cylinder are tightly fixed by using fixing bolts (37);

when in use, chloroprene rubber is spirally stirred and extruded through a spiral extrusion component in the first extrusion portion (19), and then discharged into the second extrusion section (23) under the action of the extrusion plate (36), meanwhile at least one of the calcined gypsum powders, calcium stearate and anti-aging agent is added into the second extrusion section (23) for a secondary spiral stirring and extrusion so as to achieve the secondary spiral stirring and extrusion modification of chloroprene rubber, then, the coarse rubber particles are discharged into the mixing and stirring component through the discharge plate (33) for mixing and modification, thereby ensuring the bonding strength of the rubber adhesive after being compounded with the polyester cord, and improving the bonding strength of the rubber adhesive on the polyester cord, which reaches over 20 N/cm.

2. The process for improvement treatment of a polyester cord and a rubber adhesive according to claim 1, wherein a balance plate (16) is arranged between the extrusion modification cylinder and the second rack (2), the balance plate (16) and the second rack (2) are integrally formed, and the extrusion modification cylinder is fixedly connected with the balance plate (16) by using a stator (22).

3. The process for improvement treatment of a polyester cord and a rubber adhesive according to claim 1, wherein the stirring and mixing component includes a mixing cylinder (3) with a cone-shaped bottom, the top of the mixing cylinder (3) is provided with a solvent tube (15), a top door (13) and a second motor (14); the mixing cylinder (3) is internally provided with a stirring component, and the stirring component is connected with the second motor (14); the bottom of the mixing cylinder (3) is provided with a rubber leaking tube (9), and the rubber leaking tube (9) is provided with a screw thread valve (8); the side surface of the UV light plate (6) located in the compounding box (4) is provided with a UV lamp (29), and the side surface of the drying plate (10) located in the compounding box (4) is provided with a drying lamp (30), both the UV lamp (29) and the drying lamp (30) are provided with wires (28); the compounding box (4) located on one side of the UV light plate (6) is internally provided with a drive roll (26), and the compounding box (4) located on one side of the drying lamp (30) is internally provided with a driven roll (27), a transmission component (11) is arranged between the drive roll (26) and the driven roll (27); the right end of the extrusion modification cylinder extends into the mixing cylinder (3).

4. The process for improvement treatment of a polyester cord and a rubber adhesive according to claim 3, wherein the stirring component includes a stirring shaft (40) connected with the second motor (14), the bottom of the stirring shaft (40) extends into the bottom of the mixing cylinder (3), and the stirring shaft (40) located in the mixing cylinder (3) is provided with a stirring blade component and a discharge blade (44), the stirring blade component includes stirring blade plates (42) distributed in an inverted triangular shape, the end of the top of the stirring blade plate (42) far away from the stirring shaft (40) is provided with stirring auricles, and the stirring blade plate (42) is provided with several flowing holes (43), and the discharge blade (44) is located at the connection point between the mixing cylinder (3) and the rubber leaking tube (9).

5. The process for improvement treatment of a polyester cord and a rubber adhesive according to claim 1, wherein the interior of the rubber sizing plate (24) is in a hollow shape, and the bottom of the rubber sizing plate (24) is provided with several rubber leaking holes (25).

* * * * *